United States Patent [19]

Wada et al.

[11] Patent Number: 4,998,174
[45] Date of Patent: Mar. 5, 1991

[54] FLOATING TYPE MAGNETIC HEAD ASSEMBLY

[75] Inventors: Yoshiyo Wada; Masakatsu Moriyama, both of Yokohama; Yasuhiro Yamaguchi, Yokosuka; Norio Onozato, Yokohama, all of Japan

[73] Assignee: Victor Company of Japan, Ltd., Yokohama, Japan

[21] Appl. No.: 447,123

[22] Filed: Dec. 8, 1989

[30] Foreign Application Priority Data

Dec. 9, 1988 [JP] Japan ................. 63-311063

[51] Int. Cl.⁵ .......................... G11B 5/60; G11B 5/48
[52] U.S. Cl. ..................................... 360/103; 360/104
[58] Field of Search ............................... 360/102–106, 360/109, 122

[56] References Cited

U.S. PATENT DOCUMENTS

| | | | |
|---|---|---|---|
| 4,724,500 | 2/1988 | Dalziel | 360/103 |
| 4,797,763 | 1/1989 | Levy | 360/104 |
| 4,841,396 | 6/1989 | Kawasaki | 360/104 |

FOREIGN PATENT DOCUMENTS

| | | | |
|---|---|---|---|
| 44-18667 | 8/1969 | Japan . | |
| 0085476 | 5/1985 | Japan | 360/103 |
| 62-99967 | 5/1987 | Japan . | |
| 62-167681 | 7/1987 | Japan . | |
| 62-167682 | 7/1987 | Japan . | |
| 62-167683 | 7/1987 | Japan . | |
| 8806788 | 9/1988 | PCT Int'l Appl. | 360/103 |
| 0469133 | 4/1975 | U.S.S.R. | 360/103 |
| 0669395 | 7/1979 | U.S.S.R. | 360/103 |

OTHER PUBLICATIONS

IBM Technical Disclosure Bulletin, Brock et al, vol. 21, No. 7, Dec. 78, pp. 2694–2695.
IBM Technical Disclosure Bulletin, Schneebeli, vol. 9, No. 12, May 67, p. 1746.

*Primary Examiner*—A. J. Heinz
*Assistant Examiner*—Jeff Evans
*Attorney, Agent, or Firm*—Fleit, Jacobson, Cohn, Price, Holman & Stern

[57] ABSTRACT

A floating type magnetic head assembly comprises: a magnetic head constituting a first slider; a second slider in which the first slider is so supported as to be movable in straight line only in a direction perpendicular to a magnetic recording disc and as to project outwardly beyond the second slider toward the recording disc; a cantilever arm formed from a thin elastic plate and supporting at its distal end the second slider over the recording medium, the second slider being thus supported in a freely rotatable state about a fulcrum in a form of a projection for applying pressing force from the arm on the second slider on the side thereof oppositely remote from the recording disc; and force exerting means for exerting a pressing force on the first slider by way of its supporting means.

20 Claims, 13 Drawing Sheets

FLOATING TYPE MAGNETIC HEAD ASSEMBLY

BACKGROUND OF THE INVENTION

This invention relates generally to apparatuses for recording and reproducing information signals on and from a recording medium. More particularly the invention relates to a floating type magnetic head assembly suitable for use in high-density magnetic recording and reproducing signals on and from a moving recording medium.

In apparatuses for recording and reproducing (hereinafter referred to as R/R) using magnetic discs as magnetic recording mediums, a prime requirement is that the R/R of signals be accomplished stably without damaging the surfaces of the magnetic recording mediums. For fulfilling this requirement, it has been a general practice in the prior art to provide and adapt means for operating the magnetic head in a state wherein its magnetic gap part is floating relative to the surface of the magnetic recording medium with a specific minute spacing therebetween. The magnetic head is thus operated at the time of recording an information signal on the magnetic disc and also at the time of reproducing an information signal from the magnetic disc.

Among the possible problems encountered in R/R operation which must be overcome is excessive variation of the flotation clearance of the magnetic head due to fluctuation or wavy motion of the magnetic disc surface when it is rotating. Another requirement is the assurance of smooth contact-start-stop operation and load-and-unload operation. In order to satisfy these and other requirements, floating magnetic head devices of parent-child type as disclosed in, for example, Japanese Patent Publn. No. 18667/1969 have been proposed.

In this parent-child type of floating type magnetic head device, two sliders, namely, a parent slider and a child slider supporting a magnetic head are provided. During operation these two sliders are respectively in a state of buoyancy or flotation above the surface of the magnetic recording medium due to an aerodynamic lift force acting on the flotation surfaces of the slider parts. This lift force is produced by a thin-layer gas (air) flow between the surface of the magnetic recording medium and the flotation surface of the slider parts. By this provision, variations in the flotation clearance of the sliders is reduced, whereby stable flotation of the sliders is maintained. Furthermore, vibration or resonant oscillation induced by external disturbance in the slider supporting mechanism is suppressed whereby stable flotation operation can be accomplished.

In a floating type magnetic head device of known parent-child type, however, it has been customary to form stably a relatively large flotation gap above the magnetic recording medium surface of the magnetic disc for purposes such as achieving stable operation and eliminating mechanical resonance. For this reason, such a magnetic head device has not been suitable for realizing high-density recording. In recent years, however, there has been an increasing necessity for magnetic R/R apparatus of miniature size yet large capacity. Accordingly there is a demand for the development of technology capable of accomplishing highdensity R/R operation with a magnetic head floating in a position much closer than hitherto above the magnetic recording medium surface of a magnetic disc.

In the case where high-density R/R operation is carried out in the above described manner, dust particles adhere to and collect on the magnetic gap surface functioning as the flotation surface. As the quantity of this dust gradually increases, the dust particles infiltrate into and fill the gap between the flotation surface of the floating type magnetic head and the magnetic recording medium surface of the magnetic disc. As a consequence, the recording medium surface of the disc becomes abraded and becomes overheated or otherwise damaged. Accordingly there is a need for a solution to this problem.

In order to accomplish high-density R/R by means of a floating type magnetic head, it is necessary to cause a slider device to float so that the magnetic gap surface of the magnetic head floating above the magnetic recording medium surface and this medium surface are in a mutually very close state. A magnetic recording medium having a large coercive force is suitable for high density magnetic R/R. Even with such a medium, in the case where this slider device in this state is thus buoyed up, an amply satisfactory recording operation can be carried out with respect to this magnetic recording medium with a magnetic head in which an ordinary bulk ferrite core is used, and which is in a state wherein a recording current of an order that will not give rise to magnetic saturation is passed therethrough. Furthermore, the gap loss at the time of reproduction is small. Therefore it becomes possible to realize high-density R/R by means of a floating type magnetic head.

In a floating type magnetic head of the prior art, however, its slider is large in size and also has a large mass. Furthermore, the slider has not been of a character to have ample response relative to the magnetic recording medium surface. Therefore, R/R operation is carried out with the slider in a floating state and in position which is extremely close to the recording medium surface. In this case, there is a possibility of contact or even collision between the slider and the recording medium. In such an event, instantaneous damage or breakage of the magnetic head and the recording medium is apt to occur.

Another undesirable possibility is the infiltration of dust into small crevices or recesses in the slider floating thus in extreme close proximity to the medium surface. In the case where dust particles adhere to other parts, the dust accumulation tends to grow under a snow-balling effect. The dust then gives rise to abrasive rubbing of the recording medium and contacting. As a consequence, the magnetic head and the recording medium are damaged or broken. Thus it has not been possible to carry out R/R operation with a known floating type magnetic head caused to float in a positional state of extremely close proximity to the recording medium. Therefore it has been difficult to realize high density recording by use of any floating type magnetic head known in the prior art.

SUMMARY OF THE INVENTION

According to this invention there is provided a floating type magnetic head assembly for recording and reproducing signals on and from a moving magnetic recording medium surface in a recording and reproducing apparatus, comprising a first slider having a magnetic head and having a first flotation surface, and a second slider having a second flotation surface of a greater area, than that of the first flotation surface each of the first and second sliders being of miniature size and light weight and being capable of assuming a state of flotation relative to the recording medium surface due to an aerodynamic lift force acting on the flotation surface of the slider the lift force is created by a thin-layer air flow induced between the flotation surfaces and moving magnetic recording medium surface by the motion of the latter. Supporting means are provided for supporting the first slider on the second slider in a central cavity thereof in a manner permitting the first slider to move in a straight line only in a direction substantially perpendicular to to the second flotation surface and in a manner such that the first flotation surface objects outwardly beyond the second flotation surface. An arm formed from a thin elastic plate is fixedly supported at a proximal end thereof by a part of the recording and reproducing apparatus, and at a distal or outer end thereof supports the second slider over the recording medium. Coupling means for coupling the second slider in a freely rotatable manner to the arm about fulcrum provided by a projection on the coupling means having point contact engagement with the arm, in a form of a pressing force applying part on the second slider, the part being provided in the proximity of the central part of an outer surface of the second slider opposite the flotation surface; thereof. Force transmitting means transmit the pressing force exerted by the arm by way of the pressing force applying part to the second slider, and force exerting means exert a pressing force by way of the supporting means on the first slider.

In the operation of the floating type magnetic head assembly according to this invention, dust particles may adhere to the flotation surface of the first slider. In such a case, however, such dust particles will be automatically removed. Therefore high-density R/R operations can be readily carried out. Furthermore, the first slider operates in a floating state very close to the magnetic recording medium surface. This first slider is very light. Therefore, there is no possibility of its flotation surface colliding with high parts of the recording medium surface and damaging the surface.

In addition, the first slider, which is so supported as to be displaceable in only one direction perpendicular to the flotation surface of the second slider, is of miniature size and light weight. It is also placed in a state of correct confrontation with respect to the magnetic recording medium surface. Thus, high-density R/R operations are made possible.

The nature, utility, and further features of this invention will be more clearly apparent from the following detailed description with respect to preferred embodiments of the invention when read in conjunction with the accompanying drawings, briefly described below.

DESCRIPTION OF THE PREFERRED EMBODIMENT

Figure 1:
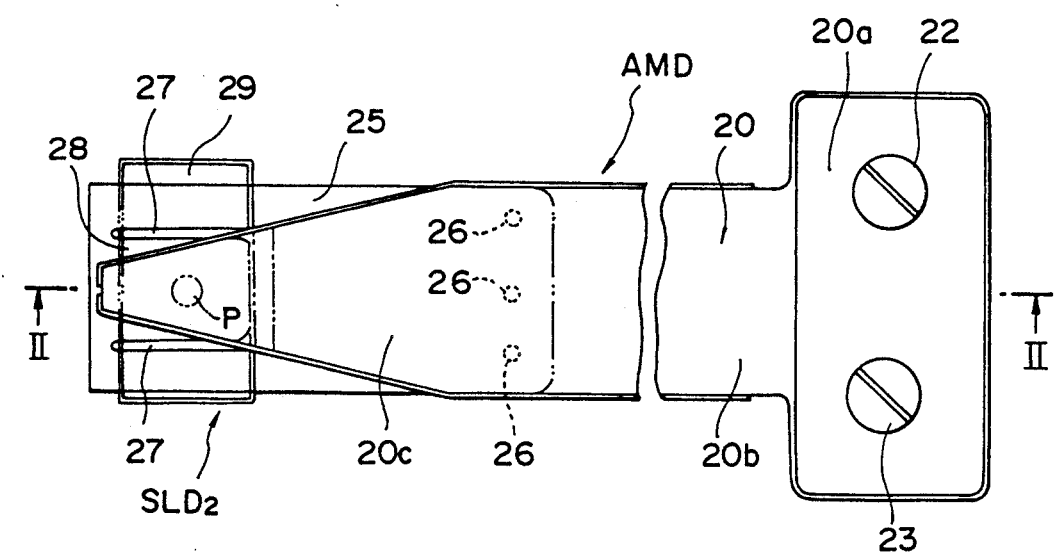
FIG. 1 is a plan view of an example of a floating type magnetic, head assembly according to this invention.
Figure 2:
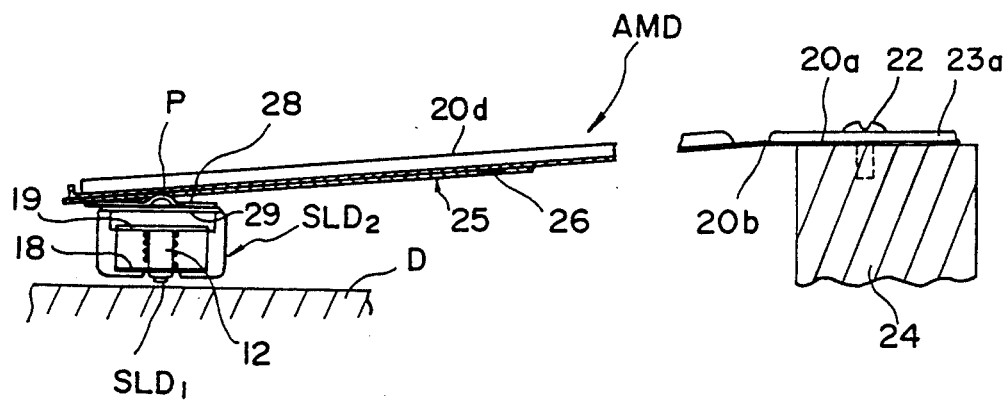
FIG. 2 is a section taken along the plane indicated by line II—II in FIG. 1.
Figure 3:
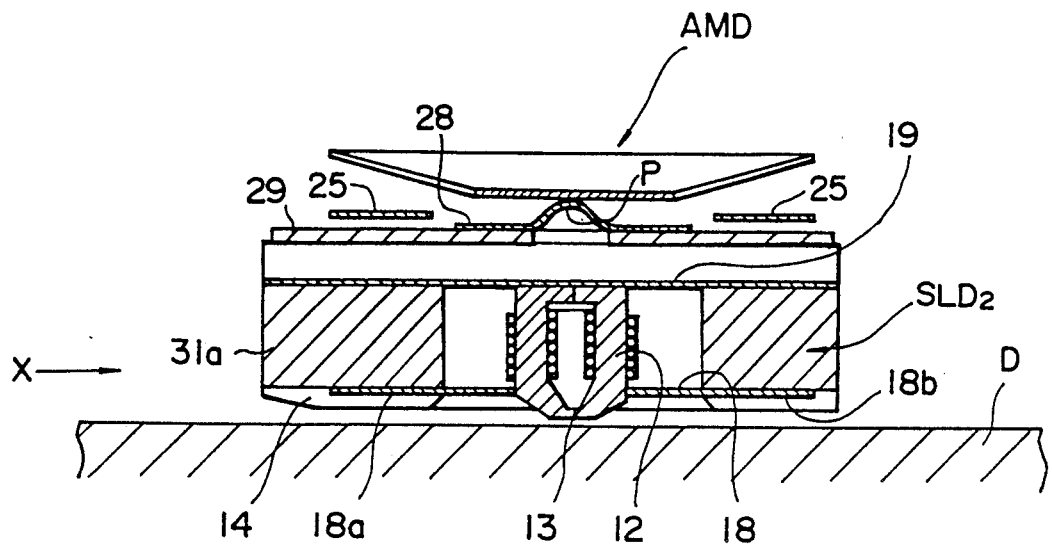
FIG. 3 is a relatively enlarged front view in section of the floating type magnetic head assembly.

Referring first to FIGS. 1, 2, and 3, the example of the floating type magnetic head assembly illustrated therein comprises essentially a first slider SLD1, a second slider SLD2, and an arm AMD. Specific details of construction of this head assembly will be described hereinafter with reference to FIGS. 3 through 9.

This floating type magnetic head assembly supports a magnetic head 12 which performs R/R operations on and from a magnetic recording medium D shown in FIGS. 2 and 3. This recording medium may be in any suitable form. For example, it may be a solid magnetic disc or a flexible magnetic disc. Also, it may be a magnetic recording medium in the form of a sheet or a tape.

The arm AMD is fabricated, for example, from a thin elastic plate 20, by press working and has an upward bended part 20d. Its proximal or fixed end 20a is fixed through a washer 23a by screws 22 and 23 to a rigid support block 24. The support block 24 is a part of a R/R apparatus in which the instant floating type magnetic head assembly is used. The arm AMD is thus in the form of a cantilever beam structure. Since a part of the bended part 20d is cut off, a part 20b of this arm AMD near its fixed end 20a possesses bending elastic force by which it applies a specific pressing force on the second slider SLD2 by way of a force-applying point P.

A coupling member 25 fabricated from a very thin elastic plate is fixed at its inner end by welding 26, 26, 26, for example, to the lower surface of the arm AMD at its distal or outer end. Near its outer end, this coupling member 25 has a U-shaped slit 27 formed therein, whereby a tongue-like tab 28 is formed. This tab 28 has therein the above mentioned protruding projection P formed by punching, for example. Furthermore, the lower surface of the tab 28 is fixed to a cover plate 29 fixed to end parts of the second slider SLD2.

With the lower surface of the coupling member 25 thus in the state of being fixed to the cover plate 29, the tip of the projection P formed on the tab 28 is in point contact with the lower surface of the arm AMD near the outer end thereof. As a result, the aforementioned elastic force in bending of the part 20b of the arm AMD near its fixed end is exerted as a specific force through the projection P on the second slider SLD2.

As described above, the lower surface of the tab 28 is fixed to the cover plate 29 fixed in turn to the end parts of the second slider SLD2. The second slider SLD2 is thus in a state of being coupled to the arm AMD by way of the coupling member 25. However, the coupling member 25 is made of a very thin elastic plate as mentioned hereinabove. Moreover, this coupling member 25 is fixed at its inner end (at 26, 26, 26) to the arm AMD at a position separated by a relatively long distance from the position of the projection P formed in the tab 28. Therefore the second slider SLD2 is in a state of being essentially coupled to the arm AMD in a point-contact manner by the projection P and the point contact allows rotation of the second slider with respect to said arm about the projection P.

Thus the projection P functions as a pressing point P to apply to the second slider SLD2 a pressing force arising from the part 20b of the arm AMD. For this reason, the position of this projection P has a significant relationship to the state of flotation of the second slider SLD2 at the time of its floating operation. At the same time, it is necessary that this position of the projection P be on the extension of the position of the operational axis of the first slider SLD1. Therefore it is imperative that the fixing of the cover plate 29 relative to the end parts of the second slider SLD2 and the fixing of the tab 28 of the coupling member 25 relative to the cover plate 29 be carried out with the relative positional relationships between the position of the projection P and those of the first and second sliders SLD1 and SLD2 in a correctly determined state.

For this purpose and, moreover, in order to facilitate the assembly work, it is highly advantageous in the production of the floating type magnetic head assembly to indicate beforehand by marks such as holes, for example, the correct attachment positions on the cover plate 29.

Figure 4:
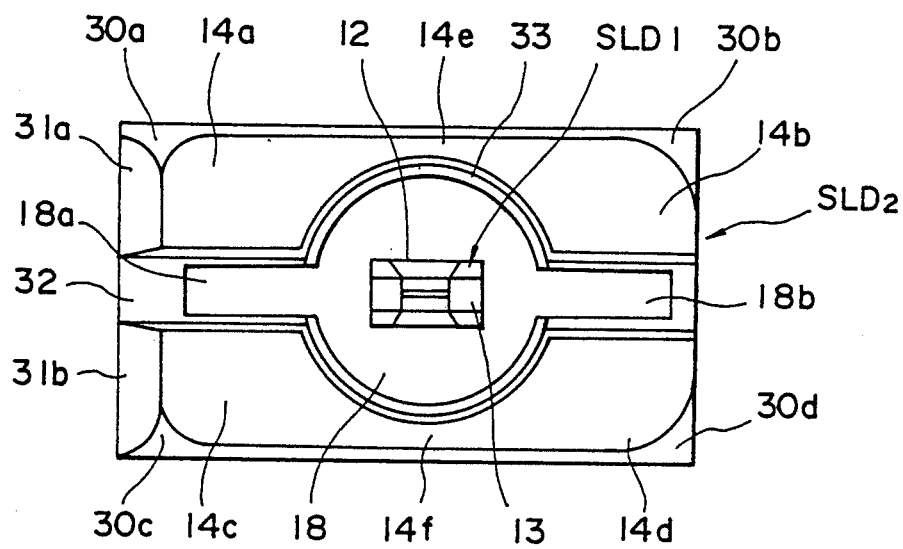
FIG. 4 is a bottom view showing the flotation surface side of a second slider, a first slider supported therein, and related parts.

The floating type magnetic head assembly as viewed from its floating surface side appears as in FIG. 4. The second slider SLD2 is provided with principal flotation surfaces 14a, 14b, 14c, and 14d. It is provided also with secondary flotation surfaces 14e and 14f lying in the same plane as the principal flotation surfaces 14a through 14d and contiguously and smoothly joined to and between the surfaces 14a and 14b and the surfaces 14c and 14d, respectively. The second slider SLD2 has a substantially block-like body. This body is provided with beveled inclined inlet guide surfaces 31a and 31b formed at the lower edge of its end surface facing the inflow side of the block toward which a thin-layer gas (air) stream is to flow as described more fully hereinafter. This block also has rounded corner surfaces 30a, 30b, 30c, and 30d at its four lower corners.

Through the center of the second slider SLD2 is formed a groove 32 between the continuous flotation surface comprising the surfaces 14a, 14e, and 14b and the continuous flotation surface comprising the surfaces 14d, 14f, and 14c. A circular through hole 33 is formed through the middle of the block. Within this hole 33, a part of the magnetic head 12 in the first slider SLD1 is supported in a displaceable state by a supporting structure comprising parallel and spaced-apart first and second support plates 18 and 19.

More specifically, the first support plate 18 is provided with a rectangular opening 18c into which the part of the first slider SLD1 near the magnetic gap surface 13 of the magnetic head 12 constituting the flotation surface of the first slider SLD1 is fitted and fixedly secured. Thereafter the parts 18a and 18b of the first support plate 18 in the vicinity of its opposite ends are fixed to the bottom surface of the aforementioned groove 32. Furthermore, the second support plate 19 has a central attaching surface 19a fixedly attached to an end part of the magnetic head 12. The edge parts of the second support plate 19 are fixed to support plate attachment surfaces 34 and 35 of the second slider SLD2. By this construction, the magnetic head 12 is displaceably supported within the round hole in the second slider SLD2.

Thus the first slider SLD1 is supported by the second slider SLD2. The first and second support plates 18 and 19 used for this purpose are disposed in mutually parallel state. Therefore the first slider SLD1 is displaceable in only one direction perpendicular to the flotation surfaces of the second slider SLD2.

By this assembly arrangement, the respective center-lines of the first and second sliders SLD1 and SLD2 can be caused to coincide.

Figure 6A:
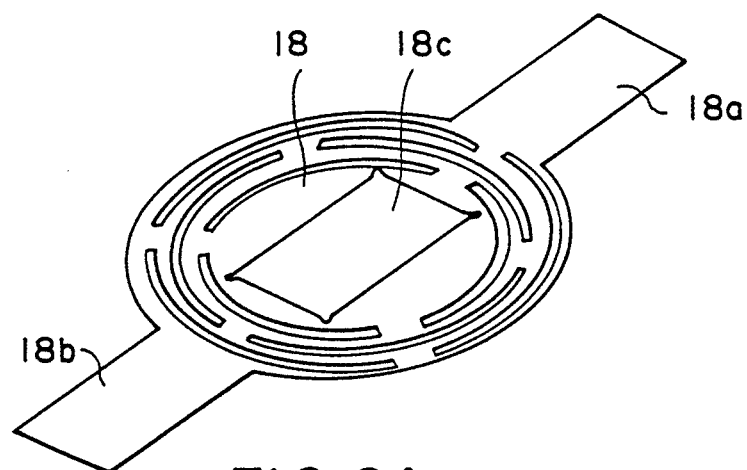
FIGS. 6A, 6B, and 6C constitute an exploded perspective view showing the magnetic head and its supporting members of the magnetic head assembly shown in FIG. 5.
Figure 6B:
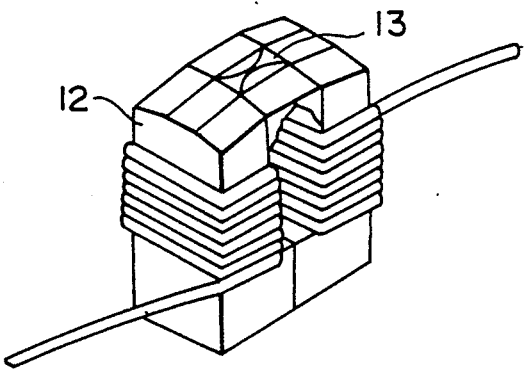
Figure 6C:
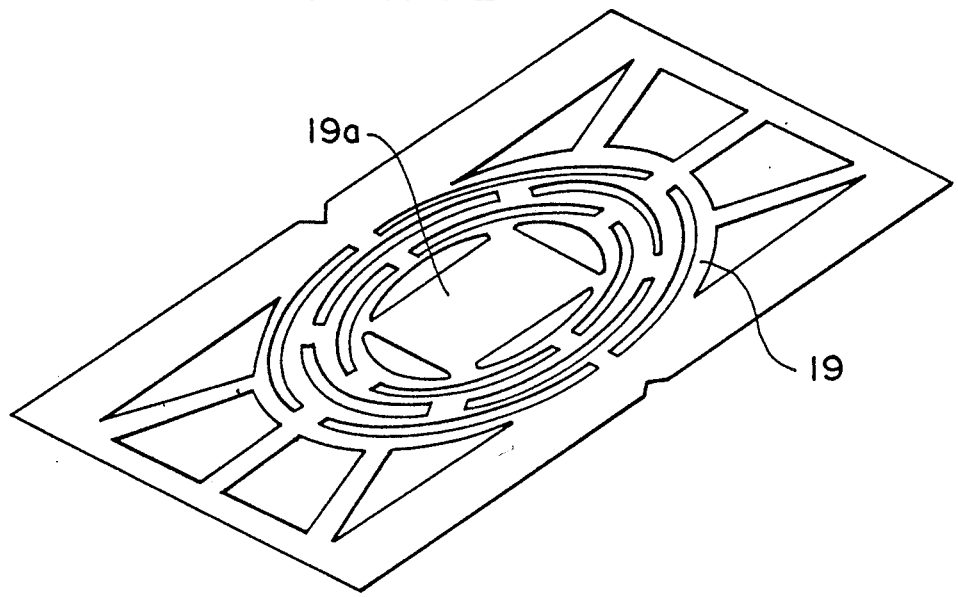

The two support plates 18 and 19 are required to have a high mechanical compliance such as to undergo satisfactory displacement even under a force of, for example, a number of tens of milligrams. This requirement can be met by forming these support plates 18 and 19 each with a fine pattern of through holes and cut-out slots as shown in FIGS. 6A and 6C and by using very thin sheet material therefor. In the fabrication of these plates, if the process is such as to leave a mechanical strain, this is apt to produce a plate of a spring action in only one direction. Accordingly it is necessary to avoid using such a process. These support plates 18 and 19 are fabricated from very thin stainless-steel sheet of a thickness of 10 microns, for example. The cut-out patterns thereof as shown in FIGS. 6A and 6C can be easily obtained by a photolithographic method.

Figure 12A:
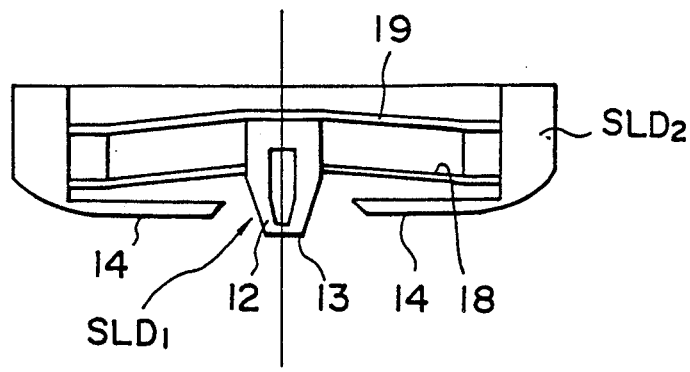
FIGS. 12A, 12B, 12C, 13, and 14 are side views for a description of the operation of the floating type magnetic head assembly.
Figure 12B:
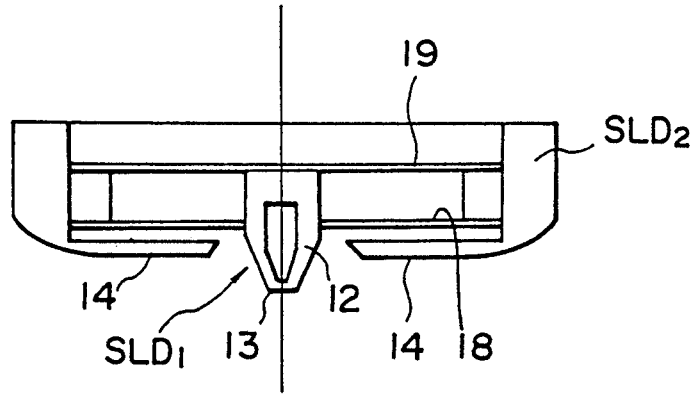
Figure 12C:
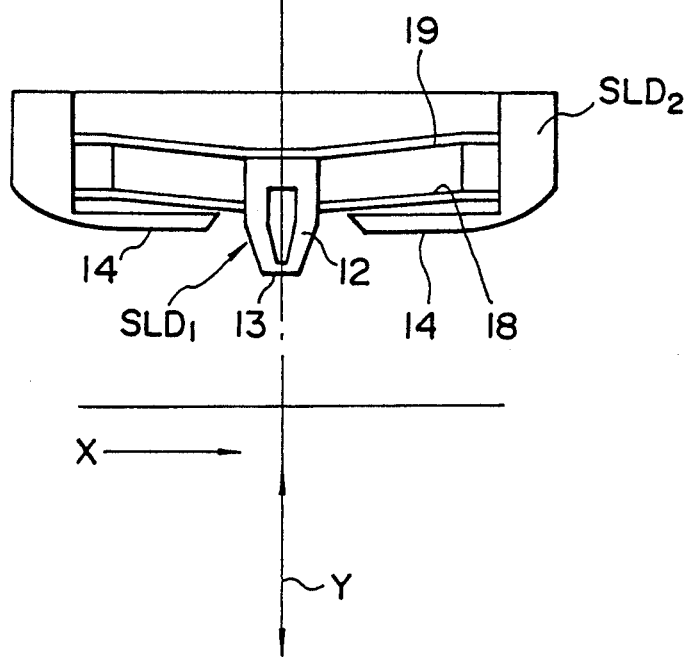

As mentioned hereinabove, the support structure comprising the two support plates 18 and 19 for supporting the first slider SLD1 affords freedom of movement thereof in only one direction perpendicular to the flotation surfaces of the second slider SLD2. For this reason, the first slider SLD1 undergoes displacement along the line Y shown in FIGS. 12A, 12B, and 12C.

In the operation of the magnetic head assembly, a thin-layer air stream is caused to flow in the X direction as indicated in FIG. 3 between the flotation surface 13 or magnetic gap surface of the first slider SLD1 and the magnetic recording medium surface. An aerodynamic lift force due to this air flow is exerted on the first slider SLD1, whereby it assumes a floating state above the recording medium surface. Then the supporting structure comprising the support plates 18 and 19 applies a pressing force in the Y direction in FIGS. 12A, 12B, and 12C on the first slider SLD1.

Figure 5:
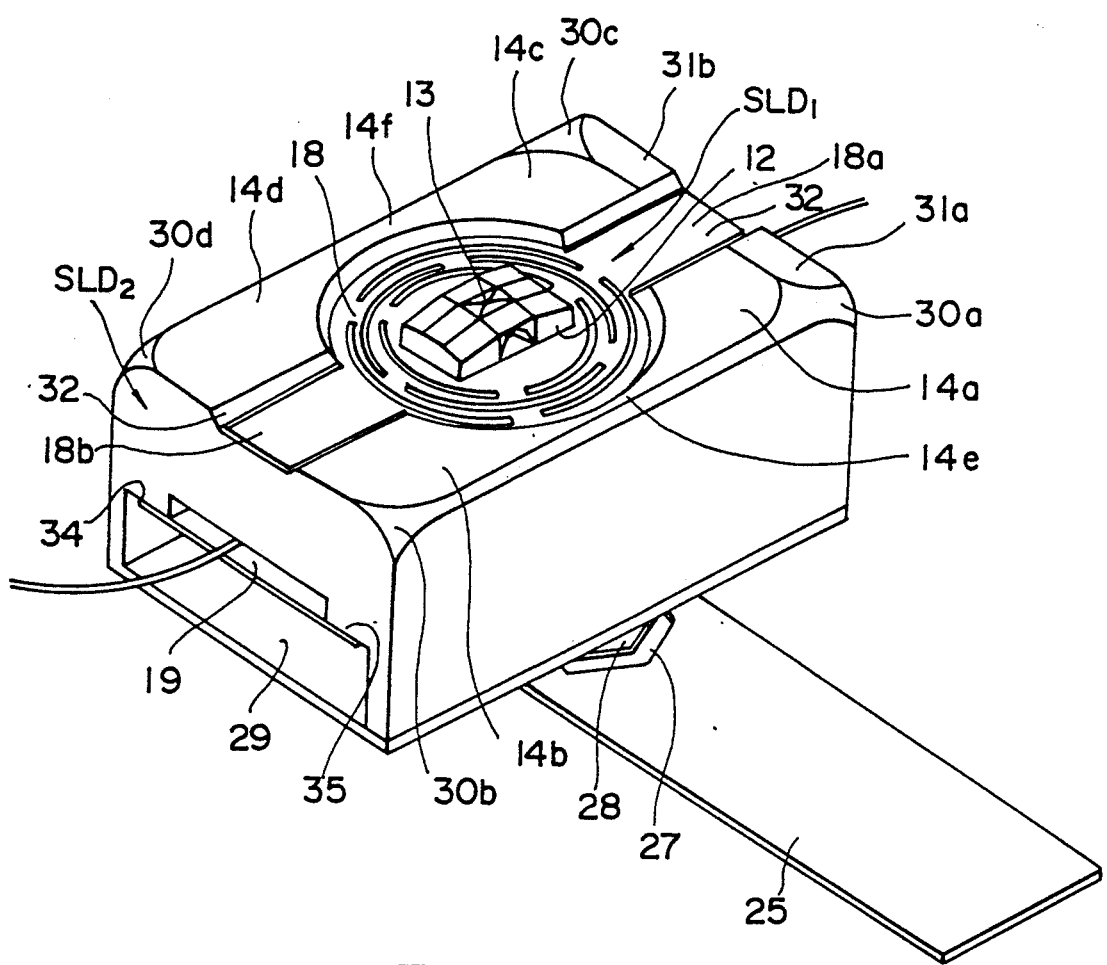
FIG. 5 is a perspective view of the principal parts of the floating type magnetic head assembly, the flotation surfaces thereof being shown facing upward.
Figure 6D:
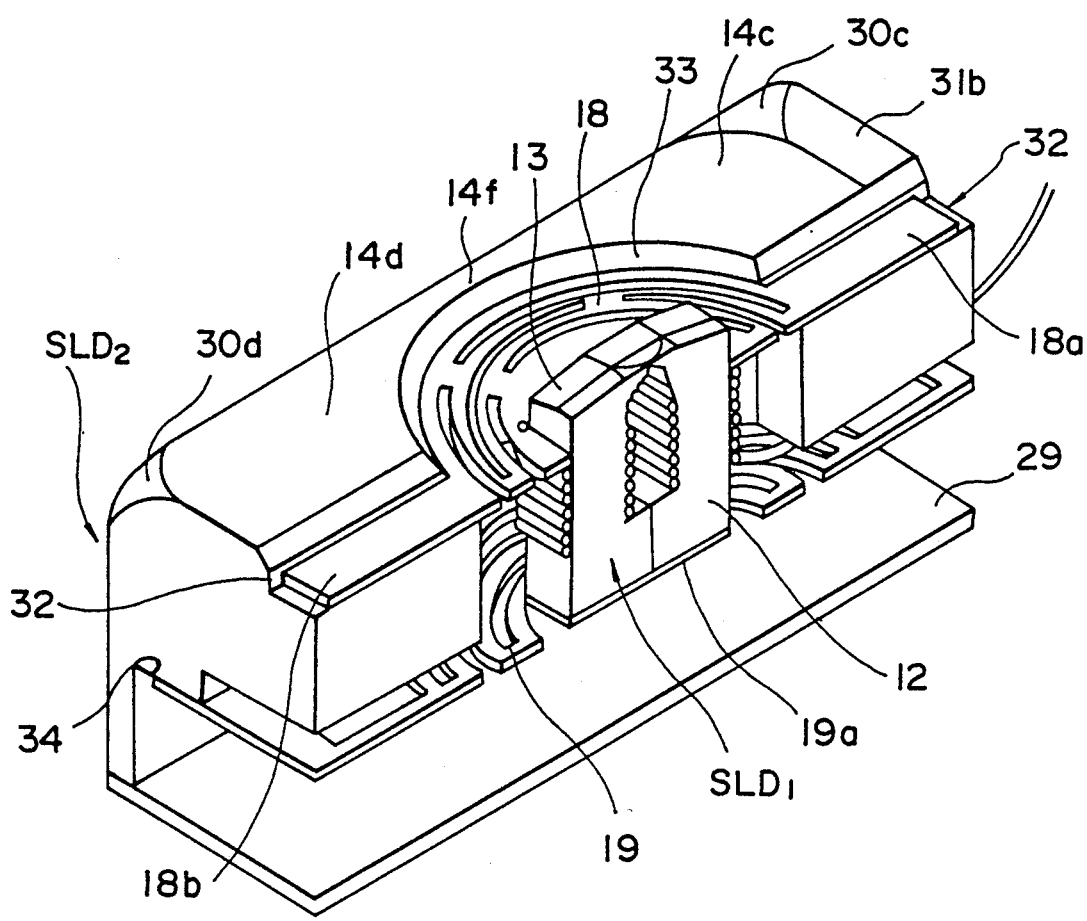
FIG. 6D is an enlarged perspective view, in section with parts cut away, showing the internal construction of the same magnetic head assembly.

A specific example of the floating type magnetic head assembly according to this invention is illustrated in FIG. 5. The first and second support plates 18 and 19 and the magnetic head 12 of this magnetic head assembly are shown in FIGS. 6A, 6B, and 6C. FIG. 6D shows the magnetic head assembly cut along a vertical plane extending in its longitudinal direction and passing through its center, thereby showing the interior construction thereof.

Figure 7:
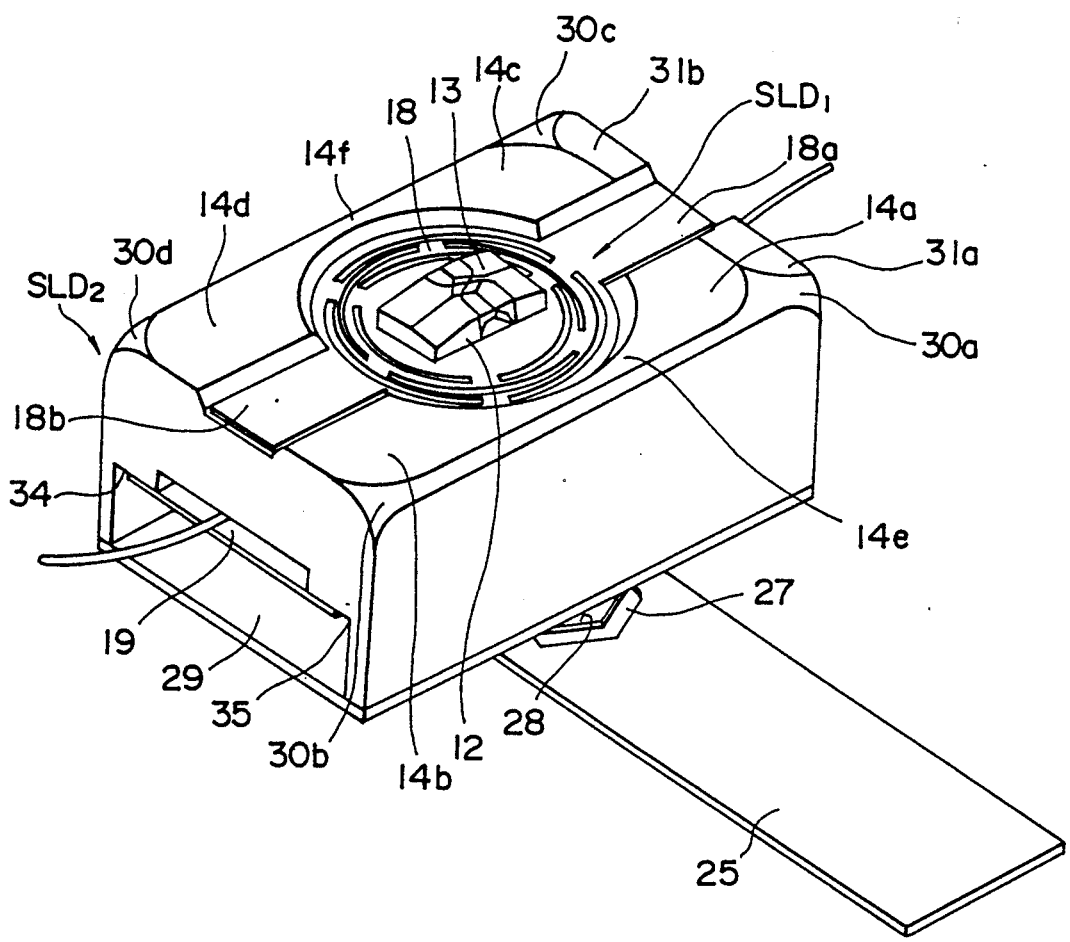
FIG. 7 is a perspective view showing the principal parts of a second example of the floating type magnetic head assembly according to the invention.
Figure 8:
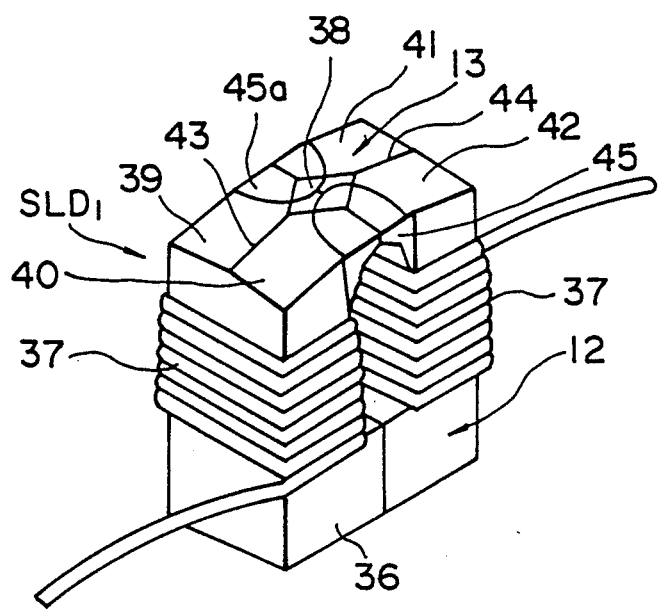
FIG. 8 is an enlarged perspective view of the magnetic head of the magnetic head assembly shown in FIG.
Figure 9:
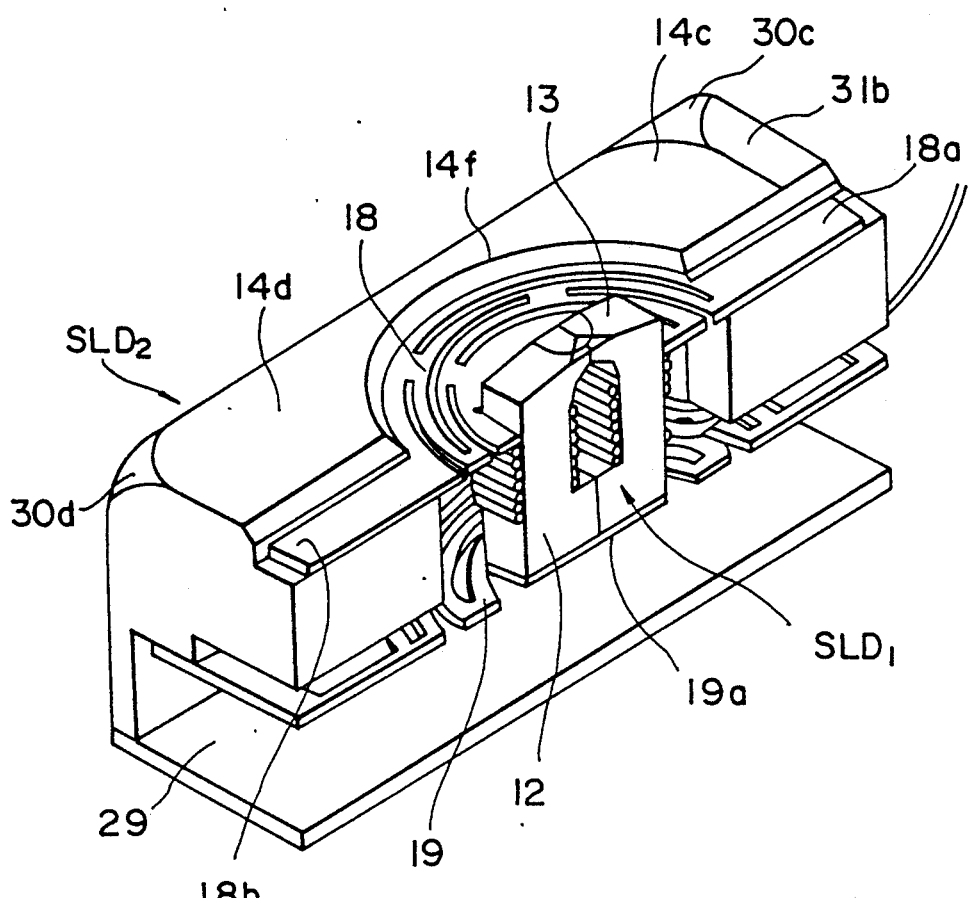
FIG. 9 is a perspective view similar to FIG. 6D showing the internal construction of the magnetic head assembly shown in FIG. 7.
Figure 11A:
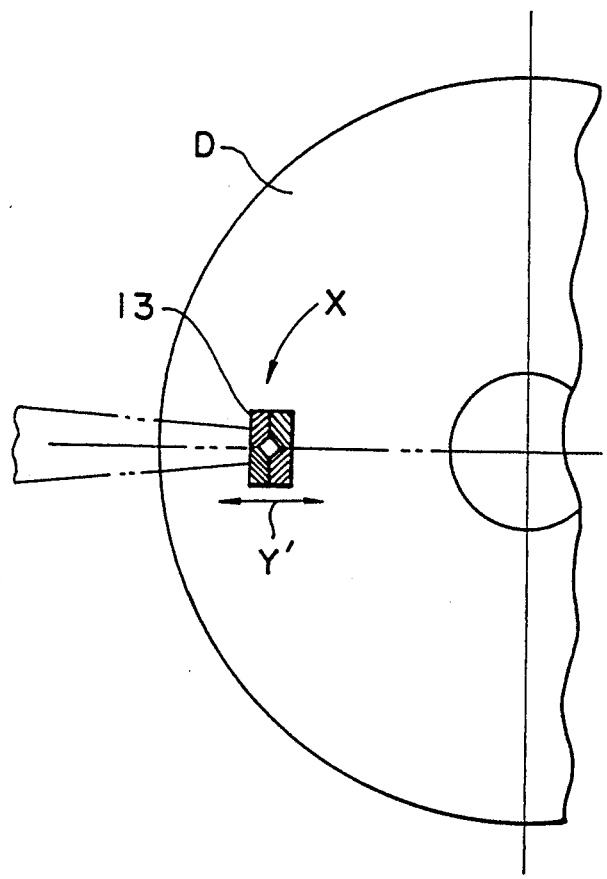
FIG. 11A is a schematic bottom view indicating the relationship of the magnetic head to a rotating recording medium.

A second example of the floating type magnetic head assembly of this invention as shown in FIGS. 7, 8, and 9 has essentially the same construction as that in the preceding example. A distinctive feature of this second example is that the magnetic gap surface constituting the flotation surface 13 of the first slider SLD1 has a shape based on a parallelogram, one diagonal line of which is in the direction X (FIG. 3) of flow of the afore-described thin-layer air stream flowing between the flotation surface 13 and the magnetic recording medium surface at the time of operation. Furthermore the magnetic gap is positioned in the vicinity of the intersection of the two diagonal lines of this parallelogram. The direction of the other diagonal line of this parallelogram coincides with the direction Y' of travel of the magnetic head assembly relative to the disc D as shown in FIG. 11A. Another feature is the formation of a flow entrance which smoothens the above mentioned thin-layer air stream. Still another feature is that the flotation surface is so chamfered that the extensions of the first above mentioned diagonal line lie in the same plane as the resulting dihedral ridge lines.

The construction of the magnet head 12 will now be described in specific detail with reference to FIG. 8.

The structural body of this magnetic head 12 is a single-crystal ferrite core 36. A coil 37 is wound around the core 36. A head slider facet 38 of the shape of a parallelogram forms the tip of the magnetic head 12.

Around the head slider facet 38 are formed chamfered facets 39, 40, 41, and 42 for forming entrance and exit passages for the thin-layer gas stream. A ridge 43 is formed at the intersection of facets 39 and 40, while a ridge 44 is formed at the intersection of the facets 41 and 42. A glass material 45 is deposited by fusion at the outer end of the magnetic head core and has an outer facet 45a. This outer facet 45a is polished to a mirror finish surface flush with the head slider facet 38 without a stepped boundary therebetween.

The above mentioned head slider facet 38 is formed into the shape of a parallelogram by mirror finishing the surfaces of the core 36. In the vicinity of the intersection of the two diagonal lines of this facet 38 is provided a magnetic gap of a specific magnetic gap width and a specific track width. Example dimensions are a magnetic gap width of 0.4 micron and a track width of 7 to 15 microns.

The facets 39 and 40 of the entrance part are formed as inclined surfaces. One purpose of this is to facilitate the inflow of the thin-layer air stream. Another is to assure that the contact and travel with respect to the magnetic recording medium at the time of contact-start-stop will be accomplished smoothly.

This magnetic head shown in FIG. 8 is fabricated by so forming a single-crystal ferrite core material that a magnetic gap of a specific gap width and a specific track width is formed. For this purpose any known method used in the fabrication of a magnetic head by welding with molten glass can be used. However, the magnetic head shown in FIG. 8 may be fabricated, for example, in the following manner.

Rough machining is first carried out by setting the life dimension at approximately 15 to 20 microns. Thereafter, in order to form the facets 39 through 42, mirror finish grinding is carried out to obtain four uniform mirror surfaces over four corners with the central part of the magnetic head as the axis of the entrance and exit inclined surfaces of an angle of approximately 12 degrees.

This mirror finish grinding is so carried out that infinitesimal serrations or notches are not formed or left at the boundaries or intersections between the head slider facet 38 formed to be of the shape of a parallelogram on the outer surface of the ferrite core 36 and the chamfered facets 39 through 42.

Next the head slider facet 38 of the core 36 is ground to a mirror finished facet parallel to the bottom face of the core. This mirror-finish grinding is so carried out that the resulting area of the head slider facet 38 will be such that the lift force to be applied thereto by the thin-layer air stream will be of a specific magnitude.

For example, the finishing of the head slider facet 38 is carried out by mirror-finish grinding in a manner such as to satisfy the conditions of (1) the facets 39 through 42 is formed so that the life dimension of the magnetic head 12 will be 10 microns; (2) the diagonal length of the head slider facet 38 is 0.3 mm, for example; the length of one side of the same facet 38 is approximately 0.21 mm.

In this mirror-finish grinding also, care must be exercised to prevent the formation of infinitesimal serrations or notches at the intersection boundaries between the head slider facet 38 and the facets 39 through 42.

Needless to say, it is desirable that the above described mirror-finish machining be carried out to produce a core 36 with a head slider facet 38 of a specific shape of a true parallelogram in the center of which the magnetic gap is precisely positioned. However, slight errors in machining in the fabrication of these parts will have little effect on the functional quality of the slider parts. Therefore, the fabrication of the magnetic head can be readily carried with precision of the same order as that for magnetic head for ordinary VTR use.

The magnetic head fabricated in the above described manner can be used in either of the following two states. In the first state, the direction of a diagonal line of the head slider facet 38 of the shape of a parallelogram is coincident with the direction of flow of the thin-layer air stream above the magnetic recording medium surface. In the second state, the direction of a diagonal line of the head slider facet 38 is coincident with the radial direction of the magnetic recording medium. By using the magnetic head 12 in either of these states, the quantity of dust adhering to the flotation surfaces of the magnetic head 12 during its floating operation is reduced. Furthermore, the removal of dust adhering to the flotation surfaces is automatically accomplished.

Figure 10A:
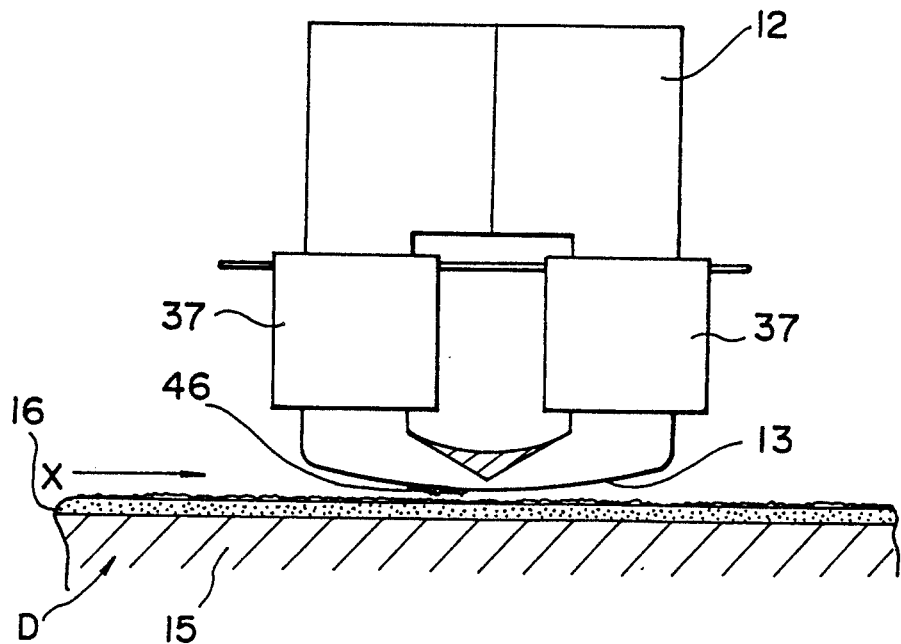
FIG. 10A is a side view showing the magnetic head in a state of flotation relative to the magnetic recording medium.
Figure 10B:
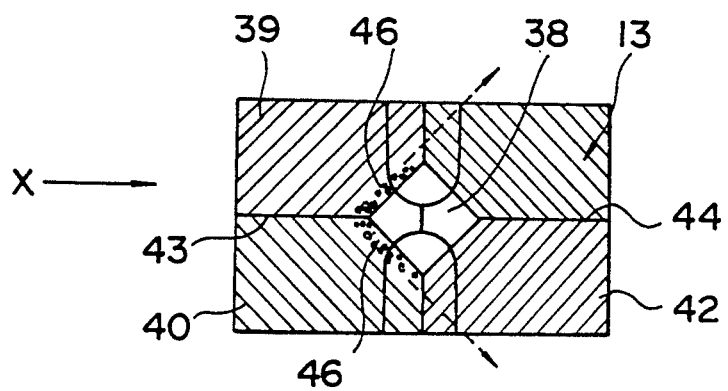
FIG. 10B is an enlarged bottom view showing the head slider facet and surrounding chamfered facets of the magnetic head and indicating the automatic discharging of dust particles.

More specifically, the aforementioned thin-layer air stream is flowing below the flotation surface 13 of the magnetic head 12 and above the surface of the magnetic recording medium D traveling in the arrow direction X as shown by one example in FIG. 10A. As a result, a lift force is exerted by the air stream flow on the head slider facet 38 of the flotation surface 13 of the magnetic head 12, which is thereby in a floating state. With the magnetic head 12 in this state, the chamfered facets 39 and 40 functioning as entrance faces of the flotation surface 13 face for the flow of the thin-layer air stream created by the movement of the magnetic recording medium as indicated in FIG. 10B.

For this reason, dust particles in the thin-layer gas stream tend to adhere to these facets 39 and 40. However, the boundary ridges between these facets 39 and 40 and the head slider facet 38 of parallelogram shape are inclined obliquely at an angle of approximately 45 degrees relative to the direction of flow of the thin-layer air flow. Consequently the dust particles 46 are blown obliquely along these boundary ridges in the directions indicated by dotted-line arrows in FIG. 10B. Thus the dust particles do not readily adhere to the flotation surface 13.

Even if some dust particles 46 do tend to adhere to the facets 39 and 40, they readily separate off from the above mentioned boundary ridges and are automatically blown away along these boundaries. Therefore, accumulation of dust particles at these boundaries giving rise to generation of heat due to frictional abrasion between the flotation surface 13 of the magnetic head 12 and the surface of the moving magnetic recording medium and damaging of the medium surface cannot occur.

Therefore, in the fabrication and assembly of a magnetic R/R apparatus with a floating type magnetic head assembly in which a magnetic head 12 as shown in FIG. 8 is used, there is no necessity of carrying out the various processes in a so-called "clean room". This is in contrast to a conventional apparatus of sealed construction type which requires fabrication and assembly in a clean room. Furthermore, the magnetic recording medium can be interchanged by freely loading and unloading into and out of the R/R apparatus. Thus excellent productivity and applicability are afforded.

Figure 11B:
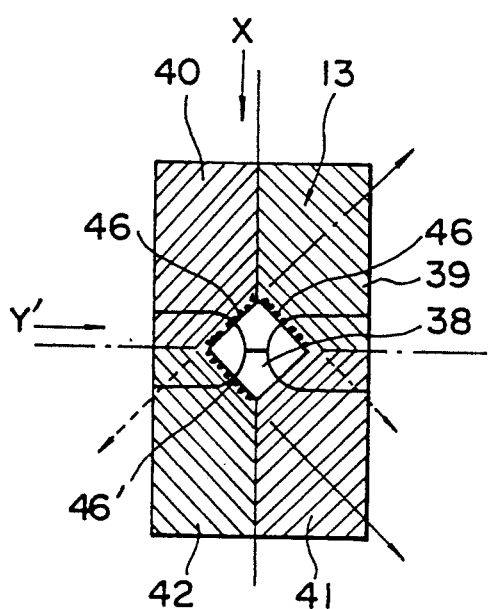
FIGS. 11B and 11C are enlarged bottom views similar to FIG. 10B of the magnetic head for a description of the automatic discharging of dust particles.
Figure 11C:
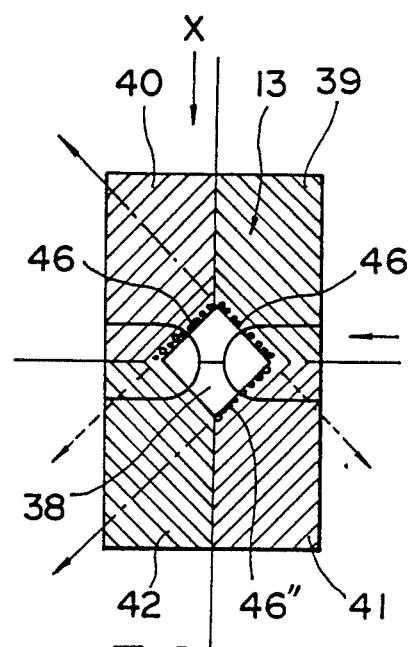

The floating type magnetic head assembly moves relative to the magnetic recording medium D also in the diametrical directions Y' as indicated in FIG. 11A. During this movement, dust particles in the thin-layer air stream tend to adhere to the boundaries between the chamfered facets 40 and 42 and the head slider facet 38 when the movement Y' is toward the center of the recording medium D as indicated in FIG. 11B. When the movement Y' is outward as indicated in FIG. 11C, the dust particles tend to adhere to the boundaries between the facets 39 and 41 and the head slider facet 38. However, these boundaries are inclined obliquely at an angle of approximately 45 degrees relative to the arrow direction Y'. Consequently the dust particles 46 are swept along these boundaries as indicated by solid-line arrows and single-dot chain line arrows. Thus the dust particles 46 and 46' (or 46 and 46") do not readily adhere. Even if they do adhere, they are readily swept off along the boundaries inclined obliquely at approximately 45 degrees relative to the air flow direction and thus are automatically removed. Therefore damaging of the recording medium surface due to accumulation of dust particles is prevented.

As mentioned hereinabove, dust particles tend to adhere on the magnetic gap surface of the magnetic head 12 functioning as the flotation surface 13 on its side facing the arrows X and Y' FIG. 11. In the case where these dust particles are not removed, they accumulate with snow-balling effect and fill the gap between the magnetic head and the recording medium surface. As a consequence, the floating action of floating type magnetic head assembly is easily obstructed.

However, as described hereinbefore, the shape of the magnetic gap surface in the form of the flotation surface 13 of the first slider SLD1 is based on a parallelogram one diagonal line of which is coincident with the X direction of flow of the thinlayer air flow. In this case, the dust particles adhering to the magnetic gap surface 13 of the magnetic head 12 are automatically removed. Therefore stable floating action is obtained without adhesion of dust particles on the flotation surface 13 even when the first slider SLD1 is caused to float very closely to the recording medium surface.

If a minute recess or notch exists on the flotation surface 13 of the magnetic head 12 used in a first slider SLD1 which is floating thus very closely to the recording medium surface, a dust particle entering the recess or notch with be entrapped therein. Then, other dust particles will collect in succession with the first particle as a nucleus. As a consequence, satisfactory floating action of the first slider SLD1 cannot be obtained.

Accordingly the material from which the first slider SLD1 is fabricated must be selected with care. A material having an uneven surface itself, such as ferrite in a sintered state, is unsuitable. A construction of the magnetic head 12 wherein the adhesive layer of a resin adhesive used to bond the core and a glass material of a base plate is exposed is also unsuitable. The reason for this is that dust particles will adhere to the resin material of the adhesive layer. As a material suitable for the first slider SLD1, a single-crystal material, for example, is used. Another suitable measure is to bond the glass base plate and the magnetic core material by fusion bonding with molten glass.

However, if even a very slight difference in surface level should be formed in the fused glass layer at the time of mirror-finish grinding of the flotation surfaces, dust particles will be entrapped in that part. Then other particles will successively adhere and collect with the entrapped particles as nuclei. Consequently the floating action of the first slider SLD1 will be obstructed. Therefore the mirrorfinish grinding of the flotation surfaces must be carried out with extreme care and under good conditions.

Examples of materials which are suitable in practice for the first and second sliders SLD1 and SLD2 are single-crystal ferrite material, titanium alumina material, ceramic material, and sapphire material. Furthermore a material on which only a small quantity of electrostatic charge is generated is advantageous for minimizing the accumulation of dust. Also for overcoming the problem of adhesion of dust particles, materials which can be caused to generate electrostatic charge of the same polarity as that of the electrostatic charge generated on the magnetic recording medium surface are desirable. Materials which are electroconductive are also suitable and desirable.

As described hereinbefore, the first slider SLD1 is supported in the second slider SLD2 by the two parallel support plates 18 and 19 in a manner permitting the first slider SLD1 to undergo displacement in only one direction perpendicular to the flotation surface of the second slider SLD2. The flotation surface 13 of the first slider SLD1 is a very small figure, for example, a square measuring 0.22 mm on one side. Under the conditions, for example, of a pressing force of 50 mg applied on the first slider SLD1 by its support plates 18 and 19, a rotational speed of 2,400 r.p.m. of the magnetic recording medium, and a position of the first slider SLD1 at 76 mm from the center of the recording medium, the flotation surface 13 of the first slider SLD1 is floated up by 500 Å from the surface of the recording medium. At this time, the pressing force at the flotation surface 13 per unit area (1 milli-square meter) is approximately 1 gr.

The first slider SLD1 which is being wafted up to a height of 500 Å above the recording medium surface is very light. For this reason, even if it should collide with a peak of the unevenness existing on the recording medium surface and undergo a movement which would seem to be damaging to the medium surface, there will be almost no possibility of actual occurrence of such damage.

The first slider SLD1 is of miniature size and very light weight. Moreover, dust particles are prevented by its shape from adhering to the flotation surface 13. Furthermore, in the case where charge particles of dust or foreign matter exist on the recording medium surface or in the case where the recording medium surface is deformed, the first slider SLD1 perform floating action by responding with up-and-down movements. Therefore, there is no possibility of the first slider SLD1 colliding with large particles of dust or foreign matter or with the recording medium surface. Furthermore, since the first slider SLD1 is of miniature size and very light weight, it cannot crush dust particles which happen to infiltrate into the gap between the flotation surface 13 and the recording medium surface. Therefore there is no possibility of crushed dust particles adhering to the first slider SLD1 and generating frictional heat between the dust particles adhering to the first slider SLD1 and the recording medium surface moving at high rotational velocity.

The second slider SLD2, which, in the state of supporting the first slider SLD1, operates in a state wherein it is floating at a higher position from the recording medium surface than the first slider SLD1. At a position thus relatively further apart from the recording medium surface, the lift force acting on the flotation surface of the slider due to the thin-layer air stream between the slider and the medium surface is small. Accordingly, the area of the flotation surface of the second slider SLD2 is made large. At the same time, the magnetic head assembly is placed in a state wherein a relatively small pressing force is applied by way of the aforedescribed projection P. Thus the second slider SLD2 is placed in a state wherein it is floating in a region where its friction with the thin-layer air stream above the recording medium is small.

Examples of specific values relating to the floating type magnetic head assembly are as follows. The flotation surface area of the first slider SLD1 is approximately 0.05 square millimeter. The second slider SLD2 then has a large flotation surface area of approximately 12 mm$^2$. This second slider SLD2 is under a pressing force of approximately 3 gr applied thereto by way of the projection P. At a position 76 mm from the center of the magnetic recording medium rotating at 2,400 r.p m, the flotation surface 14 of the second slider SLD2 floats approximately 0.6 micron from the surface of the recording medium surface. Then, on the flotation surface 14 of the second slider SLD2, a pressing pressure of approximately 0.25 gr per unit area (1 milli-square meter) is being applied.

Floating at a relatively high position as described above, the second slider SLD2 is above the highest possible peak of any unevenness of the recording medium surface. Therefore it cannot contact or rub against that surface. This is true even when the parallelism between the flotation surface of the second slider SLD2 and the recording medium surface is somewhat imperfect. Furthermore, dust particles existing on the recording medium surface merely pass through the relatively large gap between the second slider SLD2 and the medium surface and cannot adhere to the second slider SLD2.

In this connection, the lift force due to the thin-layer air stream which acts on the flotation surface 14 of the second slider SLD2 decreases with increasing height of that surface 14 from the recording medium surface. Moreover, the pressing force to be applied to the second slider SLD2 is also decreased. Consequently, disturbances such as vibrations applied from the outside on the floating type magnetic head assembly have a strong effect thereon.

This height of the second slider SLD2 above the recording medium surface is limited within a range wherein there is no adverse effect on the operation of the first slider SLD1. This limitation is due to the quantity of deviation of the parallelism of the flotation surface of the second slider SLD2 and the recording medium surface and also to the disturbances such as external vibrations. Accordingly, it is desirable that this height be of the order of, for example, 0.6 to 3 microns.

Figure 13:
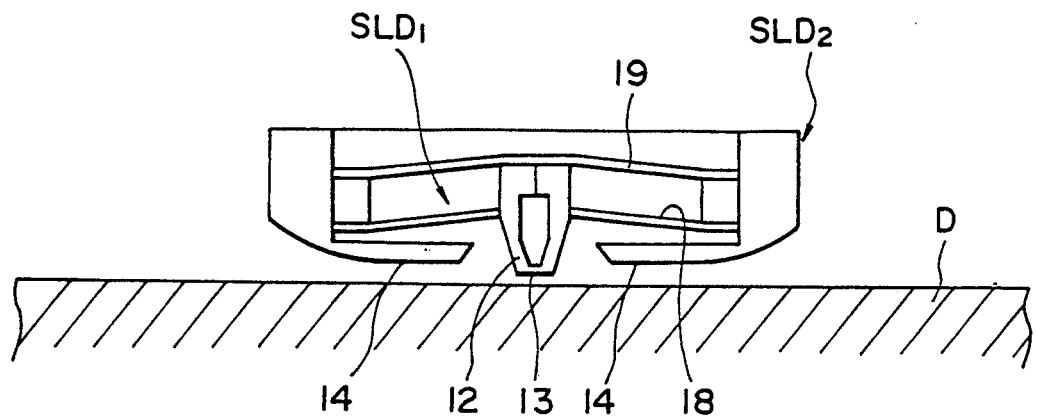

The instant floating type magnetic head assembly can be used to perform R/R operations with respect to a magnetic recording medium D in a solid state. In this case, as indicated in FIG. 13, sinking or depressing of the recording medium surface does not occur. In the case where the recording medium D is of a flexible type, however, it will be unable to rotate for reasons such as the use of a magnetic head assembly of large size or the application of a great pressing force on the recording medium surface during a R/R operation. Even if the recording medium can be made to rotate, it is liable to be damaged by the recording head assembly. For these reasons, satisfactory R/R operations with respect to a flexible magnetic recording medium by means of a floating type magnetic head of conventional design could not be expected.

Figure 14:
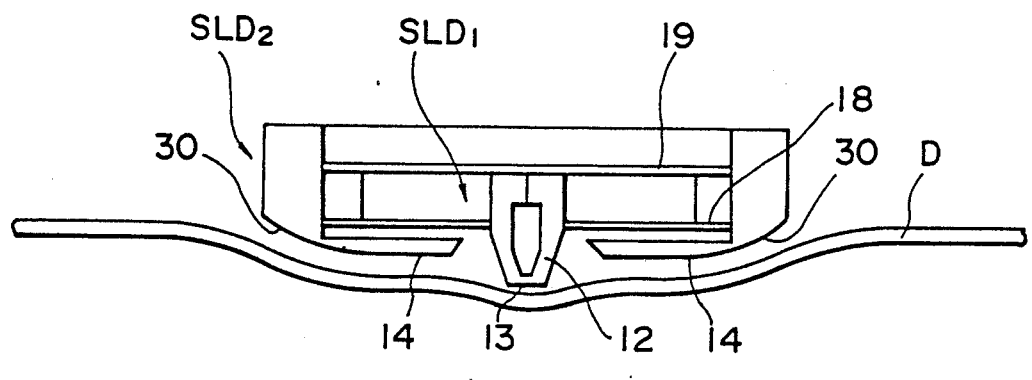

However, when a R/R operation is carried out by the use of a floating type magnetic head structure of this invention, satisfactory floating operation of the magnetic head assembly can be accomplished with a flexible recording medium D in a sunken or depressed state as indicated in FIG. 14. This flexible recording medium D deforms so as to separate away from the flotation surfaces 13 and 14 respectively of the first and second sliders SLD1 and SLD2. At the same tinme, this flexible recording medium undergoes deformation in a manner such that it separates away also from each of the rounded corner surfaces designated by reference numerals 30a through 30d in FIG. 4 (by 30 in FIG. 14).

In the case where a R/R operation is carried out on this flexible recording medium with the floating type magnetic head assembly of this invention, a lift force due to the flow of the thin-layer air stream acts also on the rounded corner surfaces 30a through 30d of the light weight second slider SLD2. Thus these surfaces 30a through 30d are also in a state of flotation above the recording medium surface. As described hereinbefore, the light weight second slider SLD2 is displaceably coupled to the arm AMD by the state of essentially point contact by the projection P. The flotation surfaces 14 and 30 of this second slider SLD2 floating at a relatively high position from the recording medium surface are in a state of correct confrontation relative to the recording medium surface. Furthermore, the first slider SLD1 of miniature size and small weight, which is so supported as to be displaceable in only one direction perpendicular to the flotation surface 14 of the second slider SLD2, is in a state such that its flotation surface 13 is also facing correctly the recording medium surface.

The purpose of providing the rounded corner surfaces 30a through 30d, the method of forming them, and other features thereof will now be described in detail.

The operation of the floating magnetic head assembly by the mode of contact-start-stop process modes on the flexible magnetic recording medium D will first be considered. In this case the parts are first in a state prior to floating of the magnetic head assembly. In this state, the magnetic head assembly is in a sunken condition in the flexible recording medium. The four corner parts of the second slider SLD2 are then contacting the flexible recording medium with the greatest pressure.

Then, if the recording medium is rotated at high speed in order to cause the recording head assembly to float off and above the recording medium, the four corner parts of the second slider SLD2 will damage the recording medium.

In order to prevent this damaging of the flexible recording medium, the four corner parts of the second slider are rounded by machining. The thin-layer air stream flowing over the flexible recording medium surface produces a lift force on the rounded corner surfaces 30a through 30d. This lift force in combination with the lift forces on the primary flotation surfaces 14a through 14d of the second slider SLD2 and on the flotation surface 13 of the first slider SLD1, buoy up the floating type magnetic head assembly. As a result, the magnetic head assembly is in a state of flotation above the flexible magnetic recording medium D as shown in FIG. 14.

That is, irrespective of whether the magnetic recording medium is of the solid type or whether it is of the flexible type, the floating type magnetic head assembly can be operated in a good floating state wherein the flotation gaps between the flotation surfaces 13 and 14 of the first and second sliders SLD1 and SLD2 and the magnetic recording mediums D are substantially the same as shown respectively in FIGS. 13 and 14.

For the above described reason, the rounded corner surfaces 30a through 30d of the four corners of the second slider SLD2 can be formed, for example, in the following manner.

First, only the second slider SLD2, in its initial state without the flotation surfaces 14a through 14f and the rounded corner surfaces 30a through 30d formed thereon, is mounted on the arm AMD. Then, by means of an ordinary surface grinder, the flotation surfaces 14a through 14f are first formed by surface lap finishing. Thereafter, a pressing force is applied to the second slider SLD2 by way of the projection P from the arm AMD on which only the second slider SLD2 is mounted. Then, with the second slider SLD2 in this state, the corner surfaces 30a through 30d are formed by rounding and finishing the four corners of the flotation surface 14 of the second slider SLD2.

The above described machining corresponds to a sort of grinding with the workpiece in actual mounted state. For the grinder, a disc sheet which has the same mechanical properties and thickness as the flexible magnetic recording medium to be used in conjunction with the floating type magnetic head assembly for R/R operation, and on the surface of which diamond particles of a particle size of approximately 0.2 micron have been uniformly and thin-ly rubbed in and imbedded is used. This grinder is rotated at the same speed, for example, 2,400 r.p.m, at which the R/R operation is to be carried out. Then, with the use of this grinder, the four corners of the flotation surface 14 are rounded and finished as a pressing force which is slightly greater than the force to be applied on the floating type magnetic head assembly during R/R operation is applied from the arm AMD, supporting only the second slider SLD2, by way of the projection P on the second slider SLD2.

At the beginning of this finishing process, angular corner projections exist at the four corners of the flotation surface 14 of the second slider SLD2. Therefore, the above mentioned diamond particles in a mixed state of being half imbedded in the grinder or existing on the surface thereof contact the corner projections, which are thereby ground in actual mounted state.

As the grinding proceeds, and as the corners become rounded, lift forces gradually act on their surfaces. The second slider SLD2 thereby floats upward. The contacting force of the diamond particles of the grinder on the rounded corner surfaces thus formed gradually decreases as a consequence. Thus the grinding state gradually becomes "soft", whereby the rounded corner surfaces become beautifully finished. In this connection, a moderate quantity of the diamond particles should be rubbed into the grinder disc. If an excessive quantity is used, the diamond particles tend to form aggregates thereof, and beautifully finished surfaces cannot be obtained even by grinding.

An example of the above described floating type magnetic head assembly of the invention and the operation thereof will now be described in terms of specific example quantities.

The flotation surface 13 of the first slider SLD1 supported in the second slider SLD2 is, for example, a square, one side of which is 0.22 mm. The magnetic head 12 provided in the first slider SLD1 has a magnetic gap length of 0.3 to 0.5 micron and a track width of 0.007 to 0.020 micron. The pressing force applied on the first slider SLD1 supported by the support plates 18 and 19 is 50 mgr (this pressing force per unit area (1 milli-square meter) of the flotation surface 13 of the first slider SLD1 being approximately 1 gr). At the same time, the second slider SLD2 has a greater area, for example, approximately 12 square millimeter, than that of the first slider SLD1 supported in the second slider SLD2. The second slider SLD2 is in a state of being subjected to a pressing force of approximately 3 gr by way of the projection P (i.e., in a state wherein a pressing force of approximately 0.25 gr is applied per unit area (1 milli-square meter) on the flotation surface 14 of the second slider SLD2). The recording medium is assumed to be rotating at a speed of 2,400 r.p.m.

Under the above described conditions, the flotation surface 14 of the second slider SLD2 is placed in a state of flotation at approximately 0.6 micron from the recording medium surface at a position 76 mm from its center. The flotation surface 13 of the first slider SLD1 is in a state of flotation at a position 500 Å from the recording medium surface.

Because the flotation surface 13, constituting the magnetic gap surface of the magnetic head 12, is in the above described state in the above example, the magnetic gap length G becomes of the order of 0.3 to 0.5 micron to obtain a G/H ratio of 3 or higher, where H is the height of the magnetic gap surface of the magnetic head 12 above the recording medium surface. Thus the magnetic head 12 is very small. Even with the use of such a small magnetic head 12, good R/R operations can be accomplished. Therefore high-density recording can be easily carried out with the floating type magnetic head assembly of this invention.

As mentioned hereinbefore, the first slider SLD1 floating at a height of 500 Å above the recording medium is of very light weight. For this reason, even if its flotation surface should collide with a peak of the unevenness existing on the recording medium surface in an action which would otherwise score or gouge that medium surface, there is little possibility of damaging that surface in actual practice. Furthermore, as described hereinbefore, there is little possibility of the second slider SLD2 damaging the recording medium surface because of the relatively greater distance between its flotation surface 14 and the medium surface. Furthermore, there is little possibility of dust particles adhering to the second slider SLD2.

Figure 15:
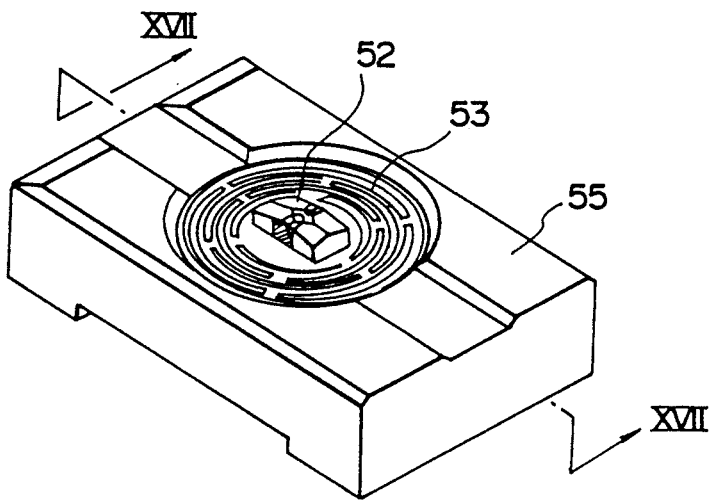
FIG. 15 is a perspective view of an essential part of a third example of the floating type magnetic head assembly according to the invention.
Figure 16:
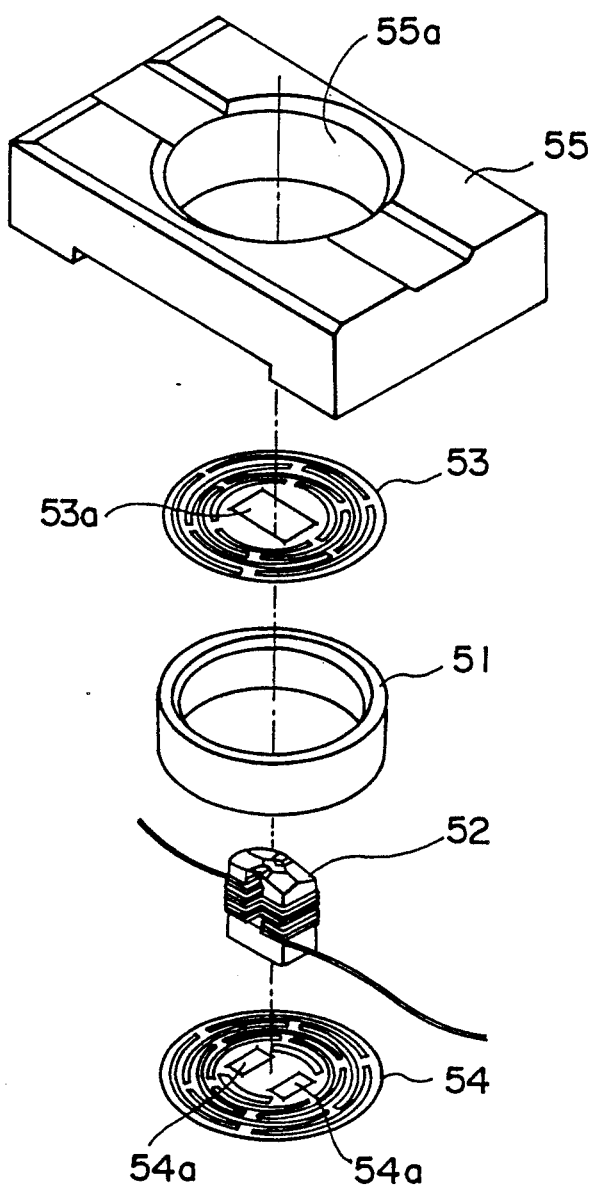
FIG. 16 is an exploded perspective view of the same essential part.
Figure 17:
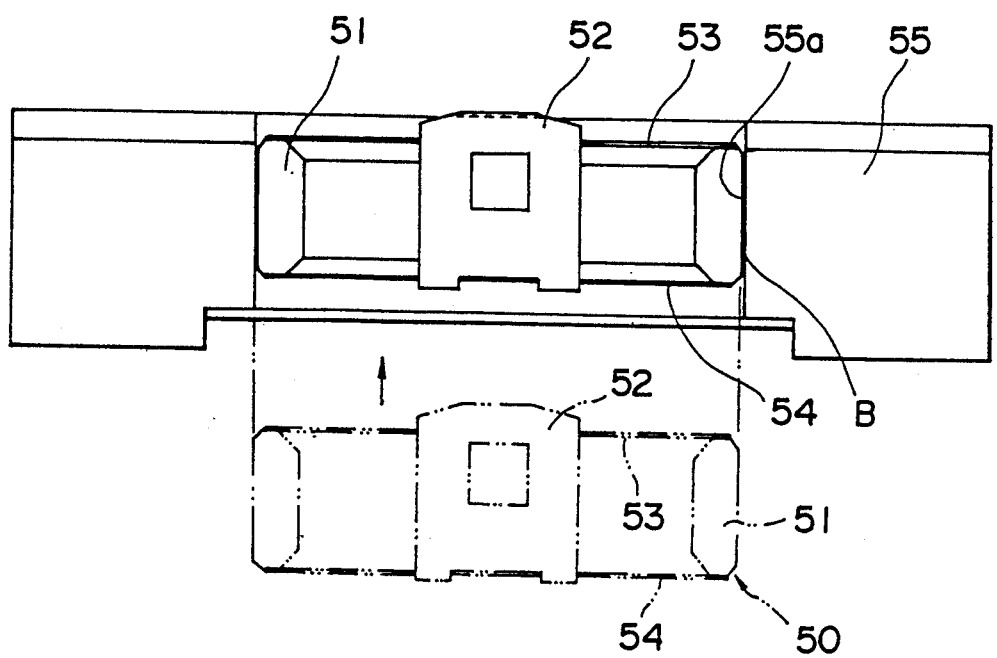
FIG. 17 is a section taken along the plane indicated by line XVII—XVII in FIG. 15 as viewed in the arrow direction.

A third example of the floating type magnetic head assembly of this invention will now be described in conjunction with FIGS. 15, 16, and 17.

In this example, a magnetic head 52 is first mounted within a ring member 51 through the use of two parallel support plates 53 and 54 to obtain an assembled unit. This unit is assembled in a manner to be supported in a parent slider (second slider) 55.

More specifically, a circular through hole 55a is formed through the center of the parent slider 55. A ring member 51 having an outer diameter which will fit in this through hole 55a is prepared. Similarly as in the preceding examples, the support plates 53 and 54 have through holes 53a and 54a of respective shapes for insertion therethrough of the ends of the magnetic head 52.

In the assembly of this example, the magnetic head 52 is first placed within the ring member 51. Then, from above and below (as viewed in FIGS. 16 and 17), the support plates 53 and 54 are respectively fitted against the upper and lower flank faces of the ring member 51 while, at the same time, the upper end of the magnetic head 52 and the two projections at its lower end are passed respectively through the through holes 53a and 54a in the support plates 53 and 54. The outer rims of the support plates 53 and 54 are then fixed to the upper and lower flank faces of the ring member 51. By this mode of assembly, the magnetic head 52 is mounted accurately and positively within the ring member 51 with their axial centerlines in alinement.

In this manner a ring-head unit 50 is assembled. This unit 50 is then assembled within the through hole 55a of the parent slider 55 by first inserting this unit 50 into the through hole 55a. The position of the unit 50 in its axial direction relative to the parent slider 55 is so adjusted that the working end (i.e., magnetic gap end) of the magnetic head 52 projects by a specific distance outwardly beyond the flotation face of the parent slider 55. Then, into the clearance gap between the outer peripheral surface of the ring member 51 and the inner wall surface of the through hole 55a of the parent slider 55, an adhesive B is introduced thereby to fix the unit 50 relative to the parent slider 55.

Thus, according to this example of the invention, a ring head unit 50 is formed beforehand as a sub-assembly by mounting the magnetic head 52 in the ring member 51. Therefore, the production process of assembling the magnetic head assembly can be carried out by a multiple parallel-line mode. Thus the assembly process efficiency can be increased. Furthermore, during the insertion of the unit 50 into the parent slider 55, adjustment of the distance of projection of the magnetic gap tip of the magnetic head 52 outwardly from the flotation face of the parent slider 55 can be carried out. Therefore this adjustment can be accomplished accurately and positively. As a result, the flotation quantity of the magnetic head 52 can be made uniform, and uniformity of R/R operation can be attained.

Still another advantageous feature of this example is that, by adjustably rotating the unit 50 within the parent slider 55, the angular positioning of the magnetic head about its longitudinal axis relative to the parent slider 55 can be accomplished accurately.

We claim
1. A floating type magnetic head assembly for recording and reproducing signals on and from a moving magnetic recording medium surface in a recording and reproducing apparatus, comprising:
   a first slider comprising a magnetic head and having a first flotation surface;
   a second slider having a second flotation surface of a greater area than that of said first flotation surface;
   each of said first and second sliders being of miniature size and light weight and being capable of assuming a state of flotation relative to said recording medium surface due to an aerodynamic lift force acting on the flotation surfaces of the sliders, said lift force being created by a thin-layer air flow induced between said flotation surfaces and said moving magnetic recording medium surface by the motion of the latter;
   a central cavity in said second slider having a cross-sectional area larger than the cross-sectional area of said first flotation surface;
   supporting means for supporting said first slider on said second slider in said central cavity in a manner permitting said first slider to move in a straight line only in a direction substantially perpendicular to said second flotation surface and in a manner such that said first flotation surface protrudes outwardly beyond said second flotation surface when the magnetic recording medium is stationary;
   an arm which is formed from a thin elastic plate and fixedly supported at a proximal end thereof by a part of said recording and reproducing apparatus, and which at a distal outer end thereof supports said second slider over said recording medium;
   coupling means having a projection thereon for coupling said second slider to said arm and engaging said arm in a point contact manner at said projection and in a rotatable manner about said projection, said coupling means comprising a pressing force applying part on said second slider in the proximity of a central part of an outer surface of said second slider facing said arm;
   force transmitting means for transmitting said pressing force exerted by said arm by way of said pressing force applying part to said second slider; and
   force exerting means for exerting a pressing force by way of said supporting means on said first slider.

2. A floating type magnetic head assembly for recording and reproducing signals on and from a moving magnetic recording medium surface in a recording and reproducing apparatus, comprising:

a first slider comprising a magnetic head and having a first flotation surface;

a second slider having a second flotation surface of a greater area than that of said first flotation surface;

each of said first and second sliders being of miniature size and light weight and being capable of assuming a state of flotation relative to said recording medium surface due to an aerodynamic lift force acting on the flotation surfaces of the sliders, said lift force being created by a thin-layer air flow induced between said flotation surfaces and said moving magnetic recording medium surface by the motion of the latter;

a central cavity in said second slider;

supporting means for supporting said first slider on said second slider in said central cavity thereof; and wherein said second flotation surface of said second slider is divided into two halves by a groove formed therein in the direction of flow of said thin-layer air flow, said halves being of symmetrically opposed shapes on opposite sides of said groove, each half comprising two wide parts and a narrow part joining the wide parts, all second flotation surface parts lying in the same plane.

3. A floating type magnetic head assembly as claimed in claim 2 wherein: said second slider is formed to have beveled inclined inlet flow guide surfaces at an end thereof for inflow of said thin-layer air flow, and all corners of said second slider facing said magnetic recording medium are smoothly rounded.

4. A floating type magnetic head assembly as claimed in claim 1 wherein: the magnetic gap of said magnetic head of said first slider and said pressing force applying part on said second slider are positioned in the proximity of one and the same line perpendicular to said second flotation surface.

5. A floating type magnetic head assembly as claimed in claim 1 wherein: said pressing force applied on said second slider is greater than the pressing force exerted on said first slider, and the value of the pressing force per unit area of said first flotation surface of said first slider applied on said second slider is greater than the value of the pressing force per unit area on said second flotation surface of said second slider.

6. A floating type magnetic head assembly as claimed in claim 1 wherein: said magnetic head has at the center of the first flotation surface a head slider facet of a shape based on a parallelogram one diagonal line of which is in the flow direction of said thin-layer air flow, and the magnetic gap of said magnetic head is positioned in the vicinity of the intersection of the two diagonal lines of said parallelogram.

7. A floating type magnetic head assembly as claimed in claim 1 wherein: said magnetic head has at the center of the first flotation surface a head slider facet of a shape based on a parallelogram one diagonal line of which is in the flow direction of said thin-layer air flow, and the other diagonal line of which is in a direction coincident with the direction of movement of said magnetic head assembly, the magnetic gap of said magnetic head being positioned in the vicinity of the intersection of said two diagonal lines of said parallelogram, and in which said second slider is formed to have, at an end thereof for inflow of said thin-layer air flow, inlet flow guide surfaces for smoothening the inflow air flow.

8. A floating type magnetic head assembly as claimed in claim 1 wherein: said magnetic head has at the center of the first flotation surface a head slider facet of a shape based on a parallelogram one diagonal line of which is in the flow direction of said thin-layer air flow, and the first flotation surface around said head slider facet is chamfered so that extensions of said one diagonal line to the edges of the first flotation surface lie in the same plane as the resulting dihedral ridge lines.

9. A floating type magnetic head assembly as claimed in claim 1 wherein: said supporting means for supporting said first slider comprises a ring member having upper and lower ends and fitted in said second slider, and upper and lower support plates secured mutually parallel to said upper and lower ends, respectively, of said ring member and supporting said first slider therebetween, said flotation surface of said first slider being passed through an opening in said lower support plate and projecting outwardly therebeyond for confronting said magnetic recording medium surface.

10. A floating type magnetic head assembly as claimed in claim 9 wherein: said ring member is of circular shape.

11. A floating type magnetic head assembly as claimed in claim 9 wherein: said ring member is secured to said second slider by means of an adhesive.

12. A floating type magnetic head assembly for recording and reproducing signals on and from a moving magnetic recording medium surface in a recording and reproducing apparatus, comprising:

a first slider comprising magnetic head and having a first flotation surface;

a second slider having a second flotation surface of a greater area than that of said first flotation surface and having a central part of an outer surface opposite said second flotation surface;

each of said first and second sliders being of miniature size and light weight and being capable of assuming a state of flotation relative to said recording medium surface due to an aerodynamic lift force acting on the flotation surfaces of the sliders, said lift force being created by a thin-layer air flow induced between said flotation surfaces and said moving magnetic recording medium surface by the motion of the latter;

a central cavity in said second slider having a cross-sectional area larger than the cross-sectional area of said first rotation surface;

supporting means for supporting said first slider on said second slider in said central cavity in a manner permitting said first slider to move in a straight line only in a direction substantially perpendicular to said second flotation surface and in a manner such a that said first flotation surface protrudes outwardly beyond said second flotation surface when the magnetic recording medium is stationary;

an arm which is formed from a thin elastic plate and fixedly supported at a proximal end thereof by apart of said recording and reproducing apparatus, and which at a distal outer end thereof supports said second slider over said recording medium;

coupling means having a projection thereon for coupling said second slider to said arm and engaging said arm in a point contact manner at said projection and in a rotatable manner about said projection, said coupling means comprising a pressing force applying part on said second slider in the proximity of said central part of said outer surface of said second slider;

force transmitting means for transmitting said pressing force exerted by said arm by way of said pressing force applying part to said second slider; and force exerting means for exerting a pressing force by way of said supporting means on said first slider;

said second flotation surface of said second slider being divided into two halves by a groove formed therein in the direction of flow of said thin-layer air flow, said halves being of symmetrically opposed shapes on opposite side of said grooves, each half comprising two wide parts and a narrow part joining the wide parts, all flotation surface parts on said second slider lying in the same plane.

13. A floating type magnetic head assembly as claimed in claim 12 wherein: said second slider is formed to have beveled inclined inlet flow guide surfaces at an end thereof for inflow of said thin-layer flow, and all corners of said second slider facing said magnetic recording medium are smoothly rounded.

14. A floating type magnetic head assembly as claimed in claim 13 wherein: the magnetic gap of said magnetic head of said first slider an said pressing force applying part on said second slider are positioned in the proximity of one and the same line perpendicular to said second flotation surface.

15. A floating type magnetic head assembly as claimed in claim 12 wherein: the magnetic gap of said magnetic head of said first slider and said pressing force applying part on said second slider are positioned in the proximity of one and the same line perpendicular to said second flotation surface.

16. A floating type magnetic head assembly as claimed in claim 12 wherein: said pressing force applied on said second slider is greater than the pressing force exerted on said first slider, and the value of the pressing force per unit area of said first flotation surface of said first slider applied on said second slider is greater than the value of the pressing force per unit area on said second flotation surface of said second slider.

17. A floating type magnetic head assembly as claimed in claim 12 wherein: said magnetic head has a center of the first flotation surface a head slider facet of a shape based on a parallelogram one diagonal line of which is in the flow direction of said thin-layer air flow, and the magnetic gap of said magnetic head is positioned in the vicinity of the intersection of the two diagonal lines of said parallelogram.

18. A floating type magnetic head assembly as claimed in claim 12 wherein: said magnetic head has at the center of the first flotation surface a head slider facet of a shape based on a parallelogram one diagonal line of which is in the flow direction of said thin-layer air flow, and the other diagonal line of which is in a direction coincident with the direction of movement of said magnetic head assembly, the magnetic gap of said magnetic head being positioned in the vicinity of the intersection of said two diagonal lines of said parallelogram, and in which said second slider is formed to have, at an end thereof for inflow of said thin-layer air flow, inlet flow guide surfaces for smoothening the inflow air flow.

19. A floating type magnetic head assembly as claimed in claim 12 wherein: said magnetic head has at the center of the first floating surface a head slider facet of a shape based on a parallelogram one diagonal line of which is in the flow direction of said thin-layer air flow, and the first flotation surface around said head slider face is chamfered so that extensions of said one diagonal line to the edge of the first flotation surface lie in the same plane as the resulting dihedral ridge lines.

20. A floating type magnetic head assembly as claimed in claim 12 wherein: said supporting means for supporting said first slider comprises a ring member having upper and lower ends and fitted in said second slider, and upper and lower support plates secured mutually parallel to said upper and lower ends, respectively, of said ring member and supporting said first slider therebetween, said flotation surface of said first slider being passed through an opening in said lower support plate and projecting outwardly therebeyond for confronting said magnetic recording medium surface.

* * * * *